United States Patent
Matsunami

(10) Patent No.: US 10,438,078 B2
(45) Date of Patent: Oct. 8, 2019

(54) IMAGE PROCESSING DEVICE, IMAGE PROCESSING METHOD AND COMPUTER-READABLE NON-TRANSITORY MEDIUM

(71) Applicant: FUJITSU LIMITED, Kawasaki-shi, Kanagawa (JP)

(72) Inventor: Tomoaki Matsunami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 15/457,256

(22) Filed: Mar. 13, 2017

(65) Prior Publication Data
US 2017/0277963 A1    Sep. 28, 2017

(30) Foreign Application Priority Data

Mar. 24, 2016  (JP) .................................. 2016-060784

(51) Int. Cl.
*G06K 9/00* (2006.01)
*G06K 9/42* (2006.01)

(52) U.S. Cl.
CPC ..... *G06K 9/00926* (2013.01); *G06K 9/00013* (2013.01); *G06K 9/00067* (2013.01); *G06K 9/00382* (2013.01); *G06K 9/42* (2013.01); *G06K 9/00033* (2013.01)

(58) Field of Classification Search
CPC .......... G06K 9/00926; G06K 9/00013; G06K 9/00067
See application file for complete search history.

(56) References Cited

U.S. PATENT DOCUMENTS

| 2012/0281890 A1 | 11/2012 | Kamakura et al. |
| 2015/0036893 A1 | 2/2015 | Shinzaki et al. |

(Continued)

FOREIGN PATENT DOCUMENTS

| JP | 2003-006644 | 1/2003 |
| JP | 2010-26658 | 2/2010 |
| JP | 2012-234440 | 11/2012 |

(Continued)

OTHER PUBLICATIONS

Extended European Search Report dated Aug. 3, 2017 for corresponding European Patent Application No. 17160530.6, 6 pages.

(Continued)

*Primary Examiner* — Ruiping Li
(74) *Attorney, Agent, or Firm* — Fujitsu Patent Center

(57) ABSTRACT

An image processing device includes: a biometric sensor; and a processor to execute a process comprising: detecting base points of a first and a second fingers; calculating a first standard point between one of the base points of the first finger and one of the base points of the second finger; calculating a second standard point on a bisector of an angle formed by a straight line passing through one of the base points of the first finger on an opposite side of the second finger and the first standard point and a straight line passing through one of the base points of the second finger on an opposite side of the first finger, and the first standard point; and applying an affine conversion to the palm image so that coordinates of the first and second standard points are converted into predetermined coordinates.

9 Claims, 11 Drawing Sheets

(56) References Cited

U.S. PATENT DOCUMENTS

2015/0248575 A1* 9/2015 Yamada ............ G06K 9/00067
382/126
2016/0132124 A1 5/2016 Nakamura et al.

FOREIGN PATENT DOCUMENTS

JP 2015-28724 12/2015
WO 2015-015843 2/2015

OTHER PUBLICATIONS

Li, Fang et al.,"Making Palm Print Matching Mobile", (IJCSIS) International Journal of Computer Science and Information Security , vol. 6, No. 2, Nov. 1, 2009, pp. 1-9, XP055392378.
Wu, Xiangqian et al.,"HMMs Based Palmprint Identification", Jul. 15, 2004, Biometric Authentication, Springer-Verlag, Berlin Heidelberg, pp. 775-781, XP019007714.
Angelo, Genovese, "4.3 Touch-Based Palmprint Recognition" in "Touchless Palmprint Recognition Systems", Jan. 1, 2014, Springer International Publishing, pp. 61-85, XP055393729.

* cited by examiner

IMAGE PROCESSING DEVICE, IMAGE PROCESSING METHOD AND COMPUTER-READABLE NON-TRANSITORY MEDIUM

CROSS-REFERENCE TO RELATED APPLICATION

This application is based upon and claims the benefit of priority of the prior Japanese Patent Application No. 2016-060784, filed on Mar. 24, 2016, the entire contents of which are incorporated herein by reference.

FIELD

A certain aspect of embodiments described herein relates to an image processing device, an image processing method and a computer-readable non-transitory medium.

BACKGROUND

In a biometric authentication, a position of input biometric information may be different from that of enrollment biometric information because of inputting condition or environment of a user. The difference of the positions may cause an authentication error. In a palm vein authentication, a guide for guiding a hand posture may be used in order to reduce influence of the position difference. However, with respect to a user of which hand is larger than the guide, an image of a hand without a part thereof may be captured. In this case, a possibility of the authentication error may be increased. It is difficult to provide a guide to a mobile electronic device. And so, there is disclosed a technology of a palm authentication for reducing influence of the position difference (for example, see Japanese Patent Application Publication No. 2010-26658 and Japanese Patent Application Publication No. 2015-28724).

SUMMARY

According to an aspect of the present invention, there is provided an image processing device including: a biometric sensor configured to capture a palm image; a memory; and a processor coupled to the memory and the processor configured to execute a process, the process comprising: detecting base points of a first finger and base points of a second finger next to the first finger from the palm image; calculating a first standard point between one of the base points of the first finger on the second finger side and one of the base points of the second finger on the first finger side; calculating a second standard point on a bisector of an angle that is formed by a straight line passing through one of the base points of the first finger on an opposite side of the second finger and the first standard point and a straight line passing through one of the base points of the second finger on an opposite side of the first finger, and the first standard point; and applying an affine conversion to the palm image so that coordinates of the first standard point and the second standard point are converted into predetermined coordinates.

According to another aspect of the present invention, there is provided an image processing device including: a biometric sensor configured to capture a palm image; a memory; and a processor coupled to the memory and the processor configured to execute a process, the process comprising: detecting base points of a middle finger, base points of a ring finger, a base point of an index finger on a thumb side, and a base point of a little finger on an opposite side of the ring finger; calculating a first standard point between one of the base points of the middle finger on the ring finger side and one of the base points of the ring finger on the middle finger side; calculating a second standard point on a bisector of an angle that is formed by a straight line passing through one of the base points of the index finger on the thumb side and the first standard point and a straight line passing through the base point of the little finger on an opposite side of the ring finger, and the first standard point; and applying an affine conversion to the palm image so that coordinates of the first standard point and the second standard point are converted into predetermined coordinates.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The following is a description of embodiments, with reference to the accompanying drawings.

[First Embodiment]

Figure 1A:
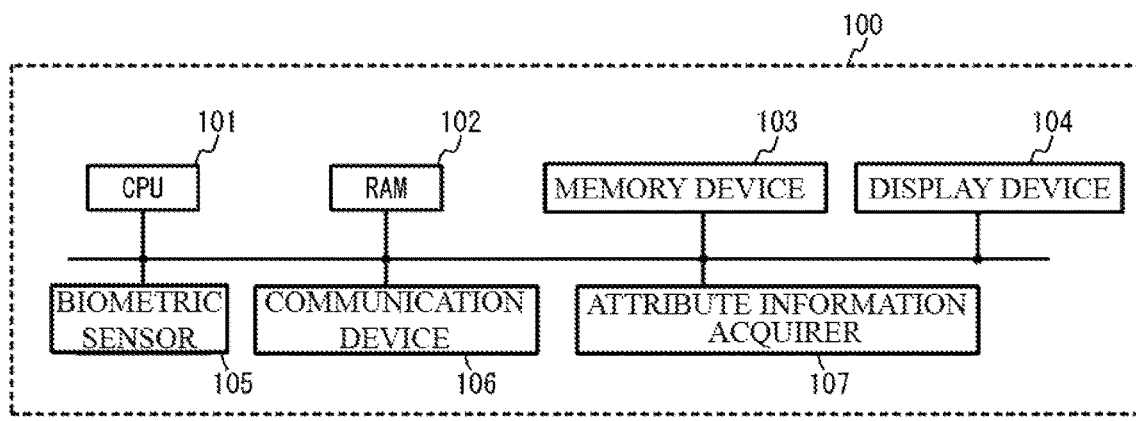
FIG. 1A illustrates a hardware structure of a biometric authentication device in accordance with a first embodiment.
Figure 1B:
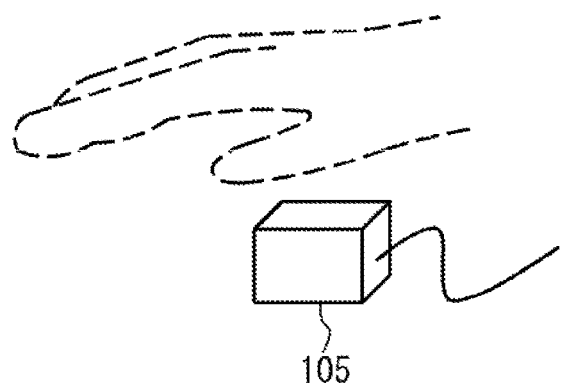
FIG. 1B illustrates a schematic view of a biometric sensor.

FIG. 1A illustrates a hardware structure of a biometric authentication device 100 in accordance with a first embodiment. FIG. 1B illustrates a schematic view of a biometric sensor 105 described later. As illustrated in FIG. 1A, the biometric authentication device 100 has a CPU (Central Processing Unit) 101, a RAM (Random Access Memory) 102, a memory device 103, a display device 104, the biometric sensor 105, a communication device 106, and an attribute information acquirer 107. These components are connected by a bus or the like.

The CPU 101 is a central processing unit. The CPU 101 includes one or more core. The RAM 102 is a volatile memory temporally storing a program executed by the CPU 101, a data processed by the CPU 101, and so on.

The memory device 103 is a nonvolatile memory device. The memory device 103 may be a SSD (Solid State Drive) such as a ROM (Read Only Memory) or a flash memory, or a hard disk driven by a hard disk drive. The memory device 103 stores an image processing program in accordance with the first embodiment. The display device 104 is such as a liquid crystal display, an electroluminescence panel, or the like and displays a result of each process described later.

The biometric sensor 105 is a sensor for acquiring biometric information of a user and acquires a palm image of a user without touching in the first embodiment. As illustrated in FIG. 1B, the biometric sensor 105 is such as a CMOS (Complementary Metal Oxide Semiconductor) camera. The biometric sensor 105 acquires an outline of a palm, a palm print, a palm shape based on information of visible light. The biometric sensor 105 may acquire a blood vessel pattern such as a vein pattern with use of near-infrared light. It is preferable that the palm image includes a whole of a palm including finger tips. However, the palm image may include a part of the palm to a middle of a finger.

The communication device 106 is a connection interface with LAN (Local Area Network) or the like. The attribute information acquirer 107 is such as a keyboard, a mouse or the like and is a device to input ID, a user name, a password or the like for identifying a user.

A biometric authentication program stored in the memory device 103 is developed to the RAM 102. The CPU 101 executes the biometric authentication program developed to the RAM 102. Thus, each process is executed by the biometric authentication device 100. By the execution of the biometric authentication program, an enrollment process, an authentication process and so on are executed.

In the enrollment process, a biometric feature acquired from a palm image captured by the biometric sensor 105 is associated with a user and is stored in a database. In the embodiment, a palm print, a vessel pattern, a palm shape or the like is extracted from a palm image is enrolled in the database as the biometric feature. In the authentication process, a biometric feature acquired by the biometric sensor 105 is collated with an enrollment feature enrolled in the database. In the embodiment, as an example, when a similarity between a vein pattern acquired in the authentication process and a vein pattern enrolled in the database is equal to or more than a threshold, it is determined that a user of the biometric feature for collation is the same as an enrolled user. Details of the enrollment process and the authentication process will be described later.

Figure 2:
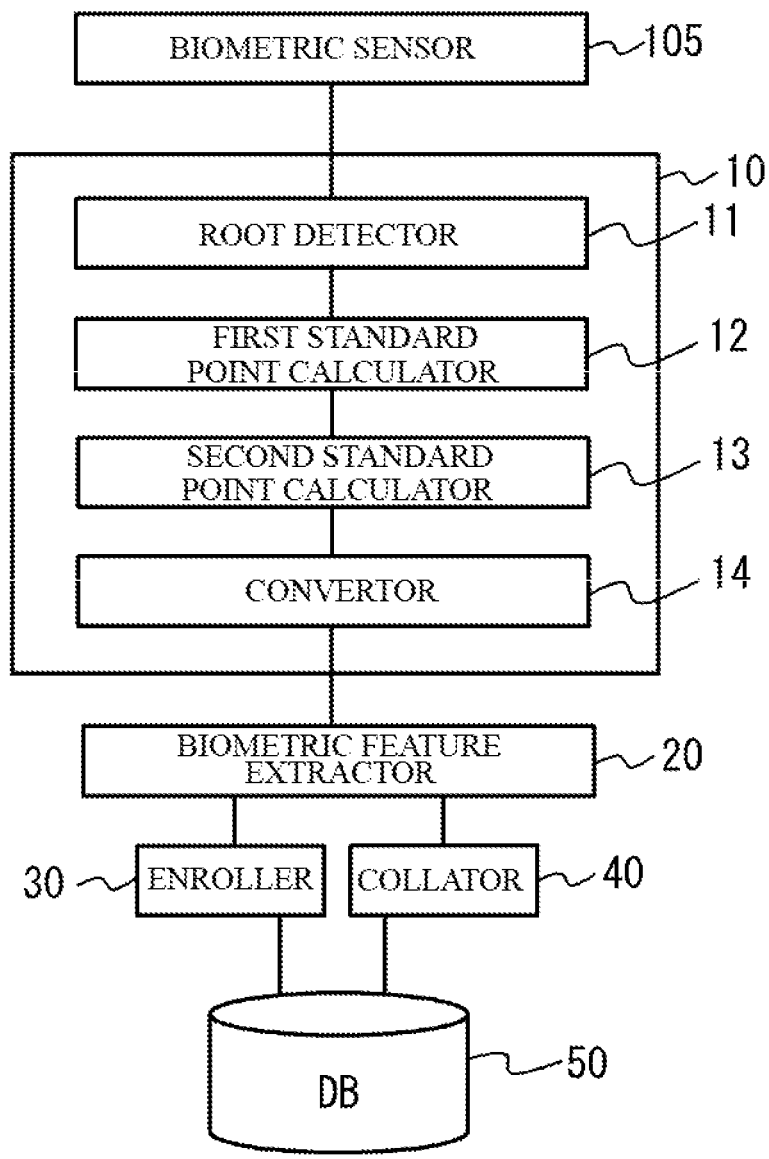
FIG. 2 illustrates a block diagram of each function achieved by execution of a biometric authentication program.

FIG. 2 illustrates a block diagram of functions achieved by execution of the biometric authentication program. By the execution of the biometric authentication program, a normalized image generator 10, a biometric feature extractor 20, an enroller 30, a collator 40, a database 50 and so on are achieved. The normalized image generator 10 has a function as an image processing device. Therefore, a program for achieving the normalized image generator acts as an image processing program. The normalized image generator 10 acts as a base point detector 11, a first standard point calculator 12, a second standard point calculator 13, and a convertor 14. In the example of FIG. 1A, FIG. 1B and FIG. 2, a stand alone terminal is illustrated. However, the structure is not limited to the stand alone terminal. For example, the embodiment can be applied to a client server system. In the embodiment, a description will be given of the stand alone terminal for simplification.

Figure 3:
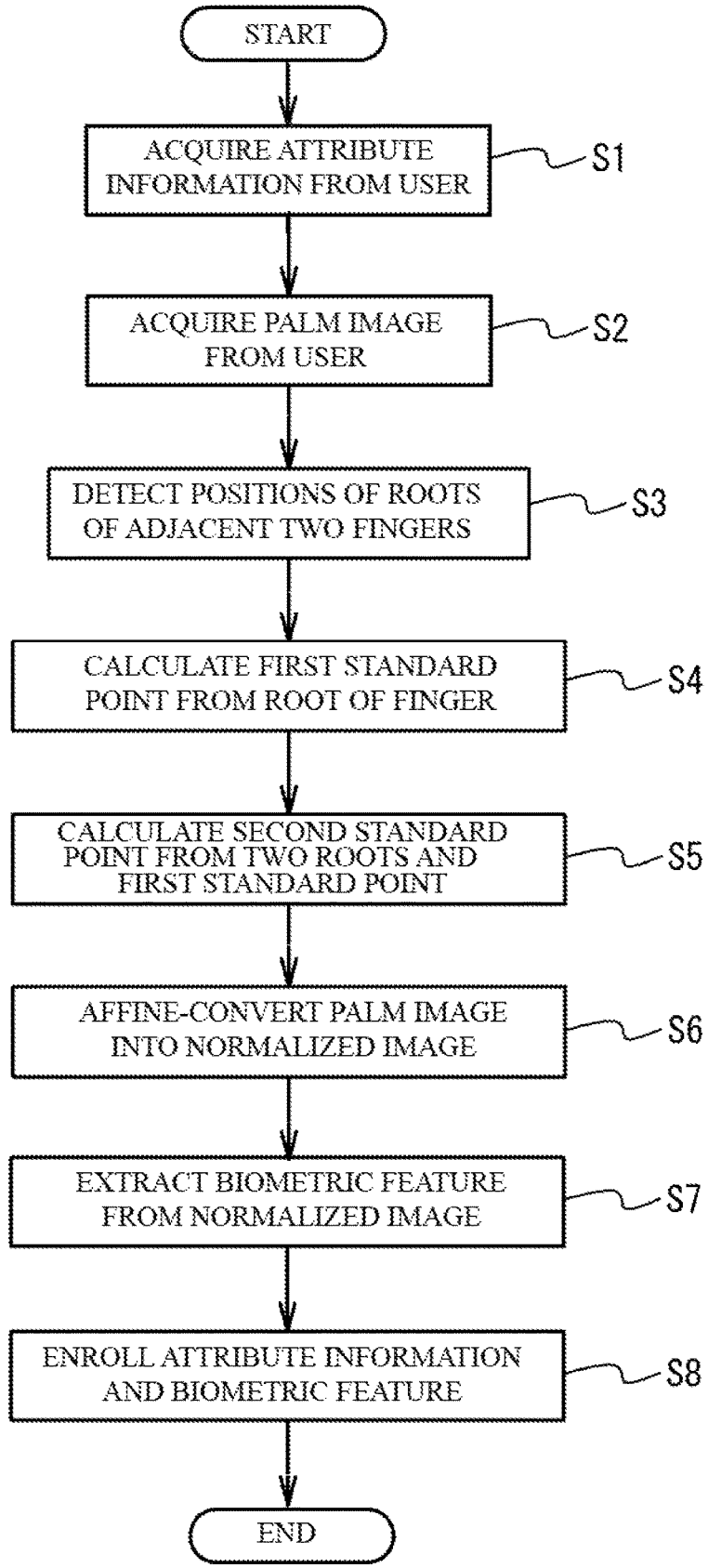
FIG. 3 illustrates a flowchart of details of an enrollment process.

(Enrollment process) FIG. 3 illustrates a flowchart of details of the enrollment process. A description will be given of the enrollment process based on FIG. 2 and FIG. 3. The attribute information acquirer 107 acquires attribute information of a user (Step S1). Next, the biometric sensor 105 captures a palm image of the user who holds his hand against the biometric sensor 105 (Step S2).

Figure 4:
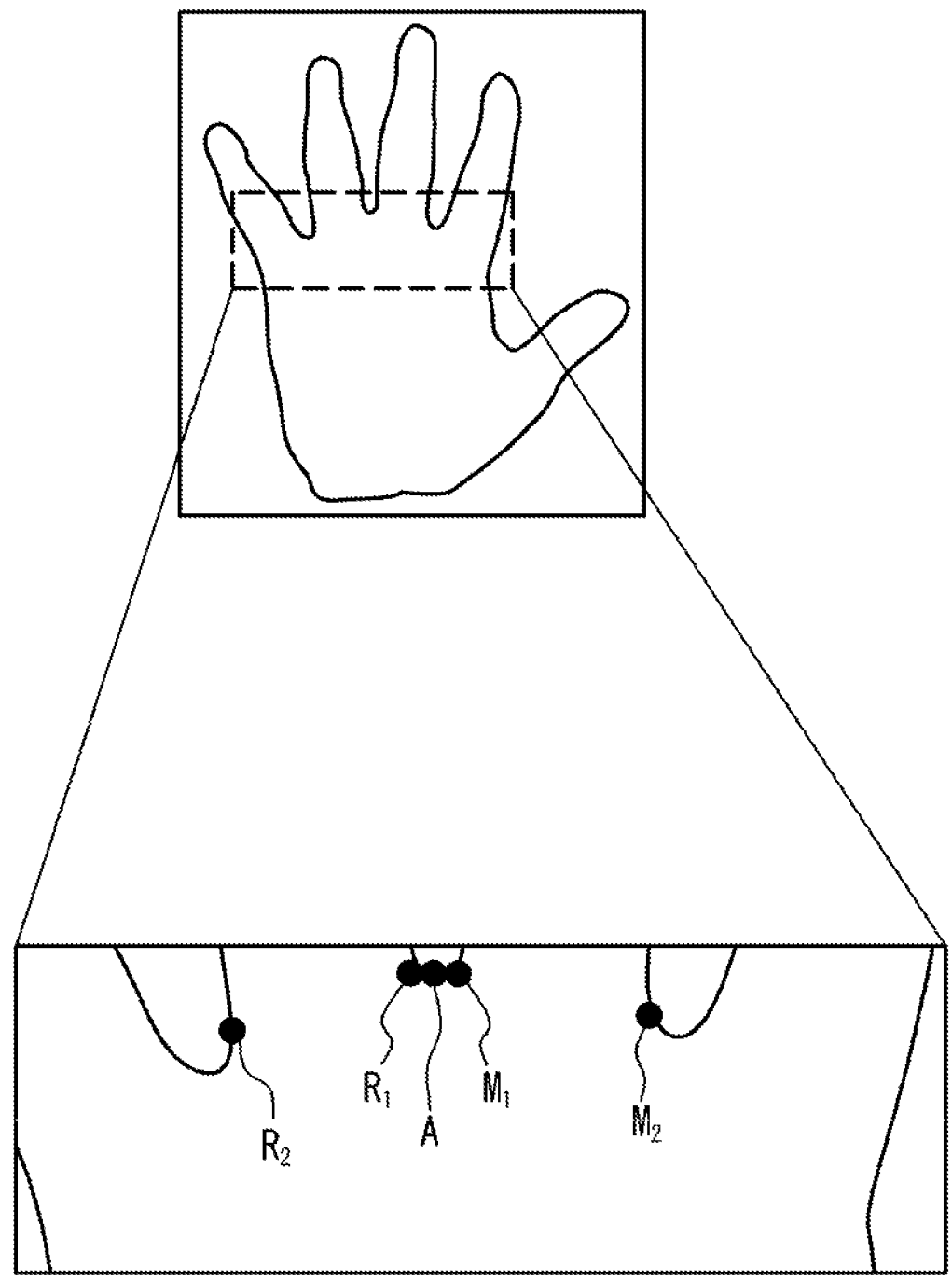
FIG. 4 illustrates a calculation of a first standard point.

Next, the base point detector 11 detects positions of base points of two adjacent fingers from the palm image captured in Step S2 (Step S3). For example, as illustrated in FIG. 4, the base point detector 11 detects base points $M_1$ and $M_2$ of a middle finger and base points $R_1$ and $R_2$ of a ring finger. The base point $M_1$ of the middle finger is a base point on the side of the ring finger. The base point $M_2$ of the middle finger is a base point on the side of an index finger. The base point $R_1$ of the ring finger is a base point on the side of the middle finger. The base point $R_2$ of the ring finger is a base point on the side of the little finger. It is possible to detect these base points by an edge detection method such as a Laplacian filter, a corner detection method such as a SUSAN (Smallest Univalue Segment Assimilating Nucleus).

Next, the first standard point calculator 12 calculates a first standard point A of the palm based on the positions of the base points detected in Step S3 (Step S4). For example, the first standard point calculator 12 calculates a top edge point of the palm that is the farthest from a wrist, as the first standard point A, as illustrated in FIG. 4. For example, the first standard point calculator 12 calculates a midpoint between the base point $M_1$ and the base point $R_1$ as the first standard point A. Alternately, the first standard point calculator 12 may calculate a cross point of a straight line $M_1M_2$ and a straight line $R_1R_2$ as a top edge point A. The first standard point calculator 12 may calculate a point between the base point $M_1$ and the base point $R_1$ as the first standard point.

Figure 5:
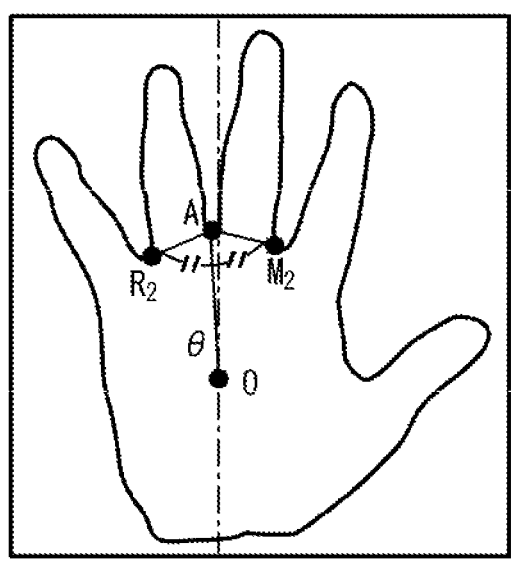
FIG. 5 illustrates a calculation of a second standard point.

Next, the second standard point calculator 13 calculates a second standard point O based on the two of the base points detected in Step S3 and the first standard point A calculated in Step S4 (Step S5). For example, as illustrated in FIG. 5, the second standard point calculator 13 calculates a point on a bisector of $\angle M_2AR_2$ as the second standard point O, the point indicating a center position of the palm achieving a predetermined length ratio of a line segment AO and a line segment $M_1M_2$. In this case, the length ratio of the line segment AO and the line segment $M_1M_2$ may be a simple integer number ratio such as 3:1. Alternately, a plurality of palm images captured in advance may be prepared. $M_1$, $M_2$, A and O may be artificially added to the images. And, statistics information such as an average or a median value of the length ratio of the line segment AO and the line segment $M_1M_2$ may be used. Although the length ratio is the line segment AO: the line segment $M_1M_2$ in the embodiment, intervals of two base points such as $R_1R_2$ or $M_2R_2$ may be used.

Next, the convertor 14 generates a normalized image by applying an affine conversion to the palm image captured in Step S2 (Step S6). For example, the convertor 14 converts a palm image I (x, y) into an image I' (x', y') in accordance with the following formula (1) in order to move the first standard point A to a center of a top edge of the image and move the second standard point $O(x_0, y_0)$ to the center of the image. A size of the palm image in a horizontal direction is "w", and a size in a vertical direction is "h". A length of a line segment OA is "d". An inclination of the line segment OA with respect to the vertical direction of the image is "θ".

$$\begin{pmatrix} x' \\ y' \\ 1 \end{pmatrix} = \begin{pmatrix} S_x\cos\theta & -\sin\theta & T_x \\ \sin\theta & S_y\cos\theta & T_y \\ 0 & 0 & 1 \end{pmatrix} \begin{pmatrix} x \\ y \\ 1 \end{pmatrix} \quad \text{[Formula 1]}$$

Figure 6:
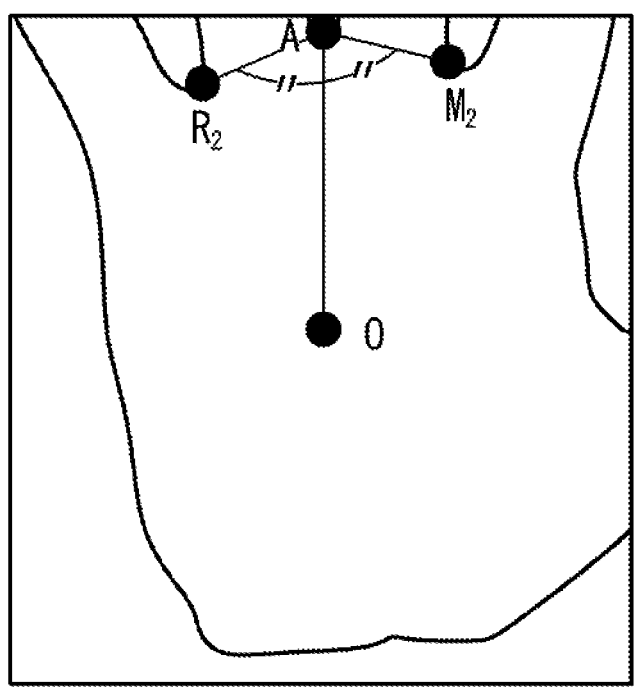
FIG. 6 illustrates a normalized image.

The following relations are satisfied. $Sx=Sy=h/2d$, $Tx=Sx(x_0-h/2)$ and $Ty=Sy(y_0-w/2)$. When a midpoint of the palm is out of the image, similar processes can be performed by preparing an extended image in which pixel values out of the image are zero. FIG. 6 illustrates a normalized image in which the first standard point A moves to a top edge center of the image and the second standard point $O(x_0, y_0)$ moves to the image center.

Next, the biometric feature extractor 20 extracts a biometric feature from the normalized image (Step S7). In the embodiment, a vein pattern is acquired as the biometric feature. The vein pattern includes a coordinate or a direction of an edge point or a branch point of a vein, or connection information of two branch points. Next, the enroller 30 associates the attribute information acquired in Step S1 with the biometric feature extracted in Step S7 and enrolls the attribute information and the biometric feature in the database 50 (Step S8). The biometric feature enrolled in Step S8 is named an enrollment biometric feature. With the processes, the enrollment process is terminated.

Figure 7:
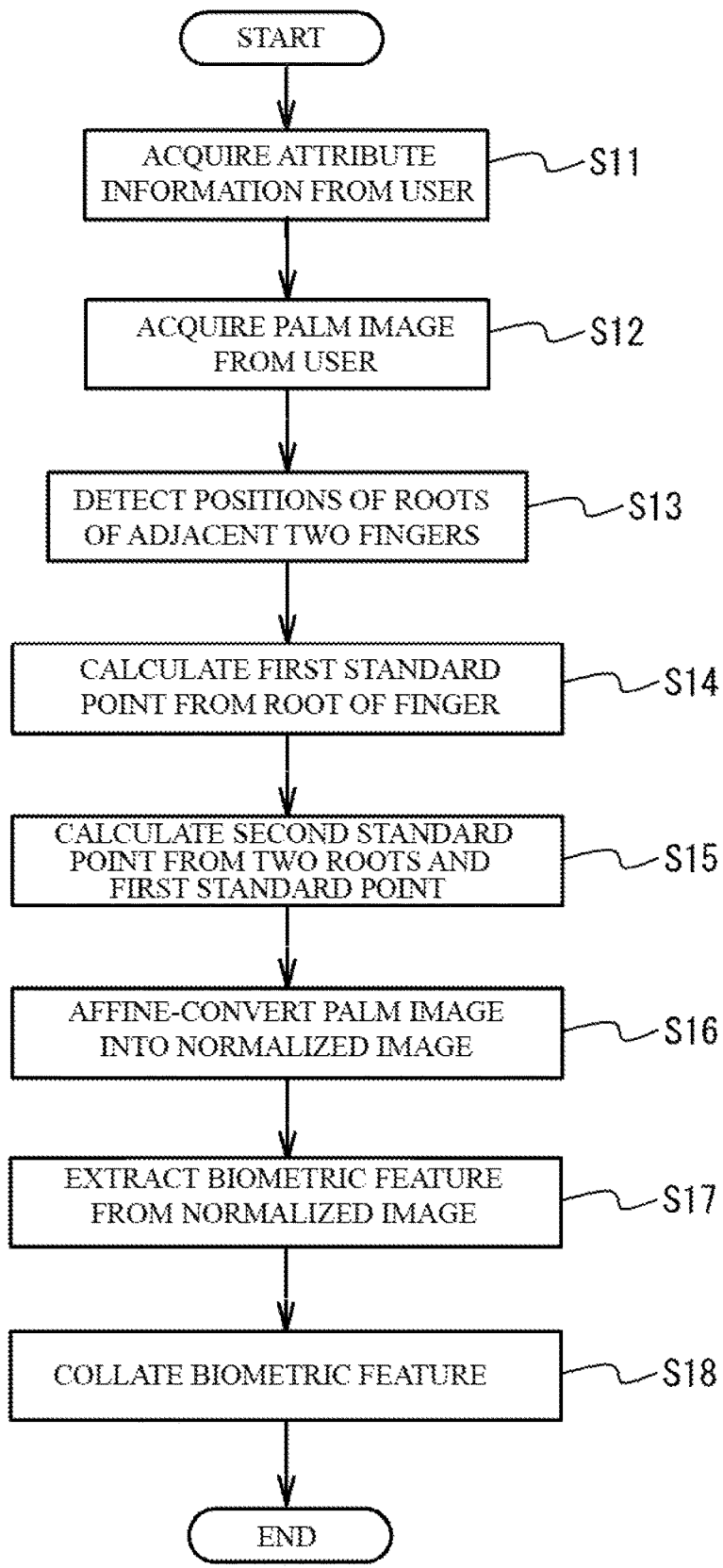
FIG. 7 illustrates a flowchart of details of an authentication process.

(Authentication process) A description will be given of the authentication process. FIG. 7 illustrates a flowchart of details of the authentication process. As illustrated in FIG. 7, Step S11 to Step S17 are the same as Step S1 to Step S7 of FIG. 3. The biometric feature acquired in Step S17 is referred to as a biometric feature for collation. After execution of Step S17, the collator 40 reads the enrollment biometric feature associated with the same attribute information from the database 50 and collates the enrollment biometric feature and the biometric feature for collation (Step S18). In concrete, the collator 40 determines whether a similarity between the enrollment biometric feature and the biometric feature for collation is equal to or more than a threshold and outputs the result.

In the embodiment, two adjacent fingers are a first finger and a second finger. A first standard point is a point between a base point of the first finger on the side of the second finger and a base point of the second finer on the side of the first finger. A second standard point is on a bisector of an angle between a straight line passing through a base point of the first finger on the opposite side of the second finger and the first standard point and a straight line passing through a base point of the second finger on the opposite side of the first finger and the first standard point. The first standard point and the second standard point are uniquely positioned in a hand of each user. Therefore, when a palm image is normalized by an affine conversion with use of these standard points as a standard, it is possible to stably make the same normalized images or normalized images similar to each other of the same user. Even if a part of a palm (for example, a lower part) is not included in the palm image, it is possible to make a normalized image. Accordingly, it is possible to correct a position gap with use of position information of a part of the palm image. Moreover, usability can be achieved by reducing the number of cases where a user retries holding of his hand. And a stable authentication can be achieved.

In the embodiment, the base points of the middle finger and the ring finger are used. However, other base points of other two adjacent fingers such as a pair of an index finger and a middle finger or a pair of a thumb and an index finger may be used.

In the embodiment, the base point detector 11 acts as a detector configured to detect a base point of a first finger and a base point of a second finger next to the first finger from the palm image. The first standard point calculator 12 acts as a first calculator configured to calculate a first standard point between a base point of the first finger on the second finger side and a base point of the second finger on the first finger side. The second standard point calculator 13 acts as a second calculator configured to calculate a second standard point on a bisector of an angle that is formed by a straight line passing through a base point of the first finger on an opposite side of the second finger and the first standard point and a straight line passing through a base point of the second finger on an opposite side of the first finger, and the first standard point. The convertor 14 acts as a convertor configured to apply an affine conversion to the palm image so that coordinates of the first standard point and the second standard point are converted into predetermined coordinates.

[Second Embodiment]

In a second embodiment, a description will be given of a case where a normalized image is generated with use of base points of an index finger, base points of a middle finger, base points of a ring finger and base points of a little finger of a palm image. The following process executed by the base point detector 11, the first standard point calculator 12, the second standard point calculator 13 and the convertor 14 is a process executed in Step S1 to Step S6 of FIG. 3 and Step S11 to Step S16 of FIG. 7.

Figure 8:
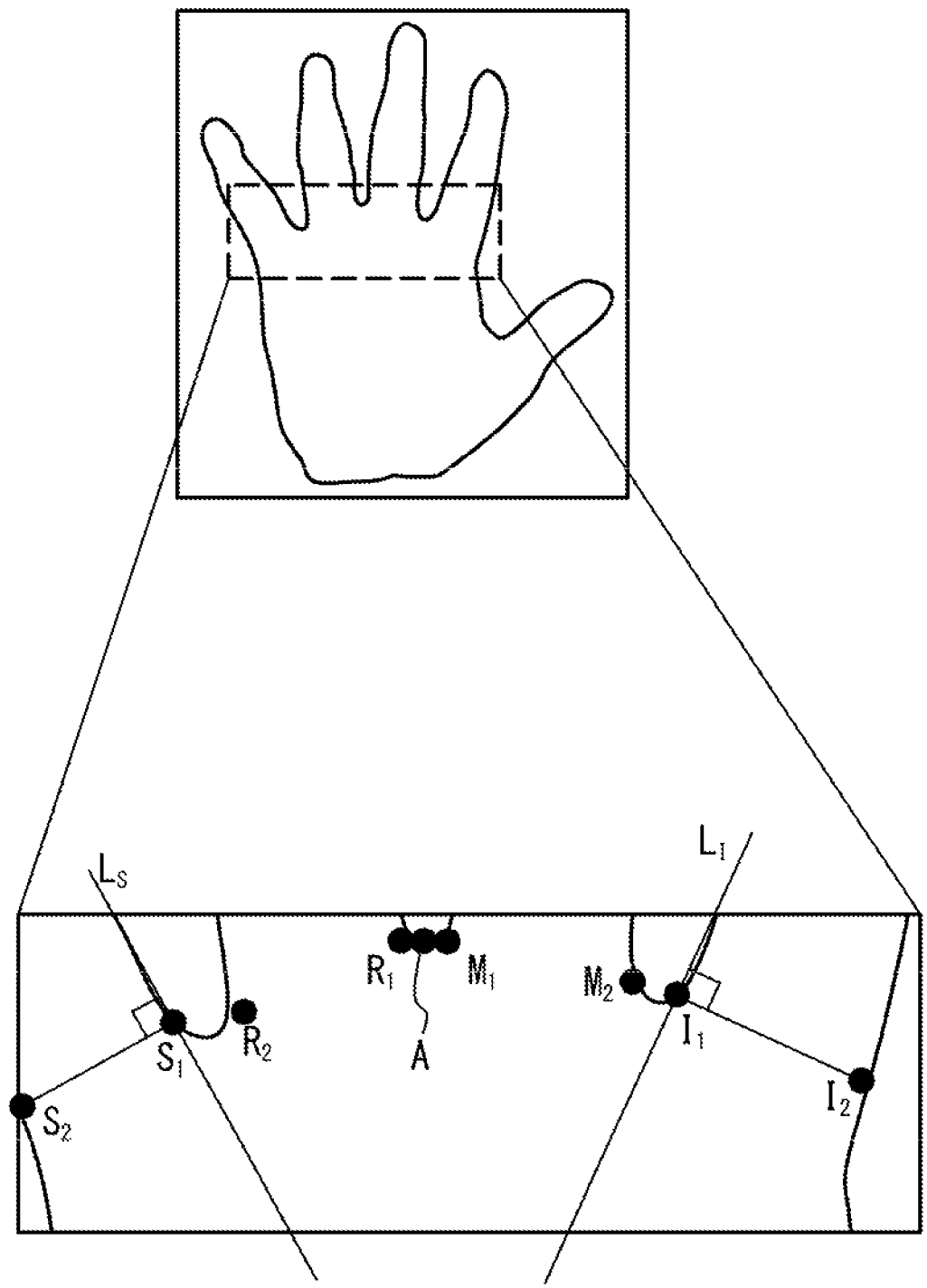
FIG. 8 illustrates a calculation of a first standard point.

The base point detector 11 detects the base points $M_1$ and $M_2$ of the middle finger, the base points $R_1$ and $R_2$ of the ring finger, the base points $I_1$ of the index finger on the middle finger side and the base point $S_1$ of the little finger on the ring finger side of the palm image captured by the biometric sensor 105, as illustrated in FIG. 8.

Next, the base point detector 11 calculates an index finger vector indicating an edge direction of the middle finger side of the index finger and a little finger vector indicating an edge direction of the ring finger side of the little finger. Next, the base point detector 11 calculates a straight line that has a direction of the index finger vector and passes through the base point $I_1$ as a straight line $L_1$ and a straight line that has a direction of the little finger vector and passes through the base point $S_1$ as the straight line $L_S$. Moreover, the base point detector 11 calculates a cross point between a line that passes through the base point $I_1$ and is vertical to the straight line $L_1$ and an edge of outside of the index finger as the base point $I_2$ and a cross point between a line that passes through the base point $S_1$ and is vertical to the straight line $L_S$ and an edge of outside of the little finger as the base point $S_2$. It is possible to detect a direction of the index finger vector or the little finger vector by using an edge detection method such as a Laplacian filter.

Next, the first standard point calculator 12 calculates the first standard point A. For example, the first standard point calculator 12 calculates an upper edge point of the palm that is the furthest from the wrist, as the first standard point A, as illustrated in FIG. 8. For example, the first standard point calculator 12 calculates a midpoint between the base point $M_1$ and the base point $R_1$, as the first standard point A. Alternately, the first standard point calculator 12 may calculate a cross point of the straight line $M_1M_2$ and the straight line $R_1R_2$, as the first standard point A. Alternately, the first standard point calculator 12 may calculate a cross point of the straight line $M_1I_1$ and the straight line $R_1S_1$, as the first standard point A. Alternately, the first standard point calculator 12 may calculate a point between the base point $M_1$ and the base point $R_1$, as the first standard point.

Figure 9:
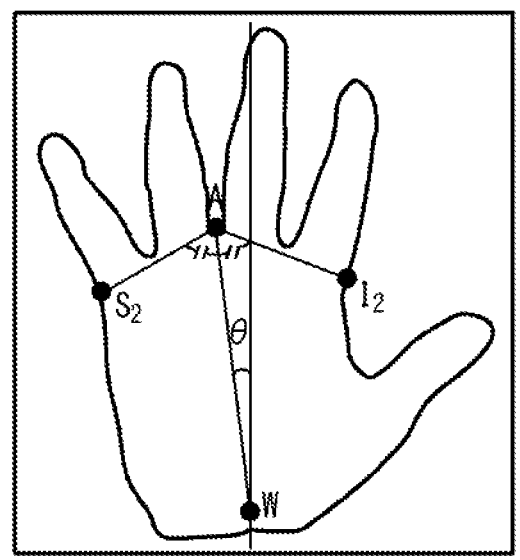
FIG. 9 illustrates a calculation of a second standard point.

Next, the second standard point calculator 13 calculates the second standard point W from two base points of a finger and the first standard point A. For example, as illustrated in FIG. 9, the second standard point calculator 13 calculates the second standard point W that is on a bisector of $\angle I_2AS_2$ and is a lower edge point of a palm that achieves a predetermined length ratio of a line segment AW and a line segment $I_2S_2$. A ratio for calculating the second standard point W may be determined with the processes that are the same as the first embodiment.

Next, the convertor 14 makes a normalized biometric image by applying an affine conversion to the palm image. For example, the convertor 14 converts an image I (x, y) into an image I' (x', y') in accordance with the following formula (2) in order to move the first standard point A to a center of a top edge of the image and move the second standard point W ($x_0$, $y_0$) into a center of a lower edge of the image. A horizontal size of the palm image is "w". A vertical size of the palm image is "h". A length of the line segment OW is "d". An inclination of the line segment AW with respect to the vertical direction of the image is "θ".

$$\begin{pmatrix} x' \\ y' \\ 1 \end{pmatrix} = \begin{pmatrix} S_x\cos\theta & -\sin\theta & T_x \\ \sin\theta & S_y\cos\theta & T_y \\ 0 & 0 & 1 \end{pmatrix} \begin{pmatrix} x \\ y \\ 1 \end{pmatrix} \quad \text{[Formula 2]}$$

Figure 10:
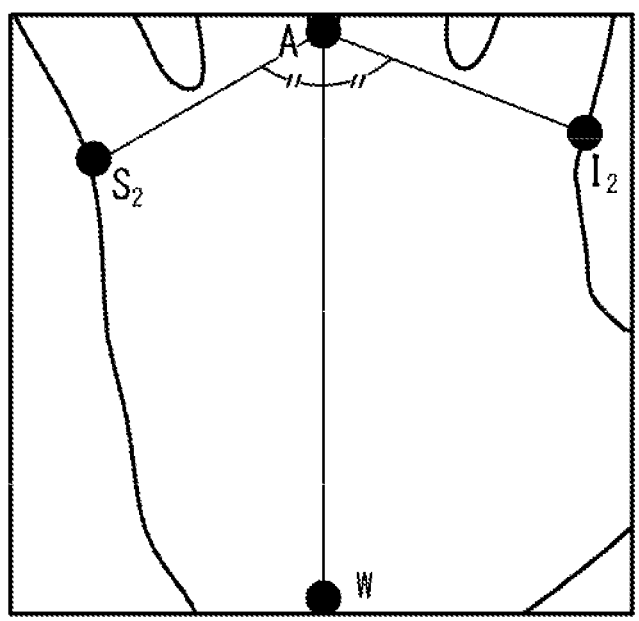
FIG. 10 illustrates a normalized image.

The following relations are satisfied. Sx=Sy=h/d, Tx=Sx ($x_0$-h) and Ty=Sy($y_0$-w). When a midpoint of the palm is out of the image, similar processes can be performed by preparing an extended image in which pixel values out of the image are zero. FIG. 10 illustrates a normalized image in which the first standard point A moves to a top edge center of the image and the second standard point W($x_0$, $y_0$) moves to the lower edge center of the image.

In the embodiment, the first standard point is a point between the base point of the middle finger on the side of the ring finger and the base point of the ring finger on the side of the middle finger. The second standard point is on a bisector of an angle formed by a straight line passing through the base point of the index finger on the side of the thumb and the first standard point, the base point of the little finger on the opposite side of the ring finger, and the first standard point. The first standard point and the second standard point are uniquely positioned in a hand of each user. Therefore, when a palm image is normalized by an affine conversion with use of these standard points as a standard, it is possible to stably make the same normalized images or normalized images similar to each other of the same user. Even if a part of a palm (for example, a lower part) is not included in the palm image, it is possible to make a normalized image. Accordingly, it is possible to correct a position gap with use of position information of a part of the palm image. Moreover, usability can be achieved by reducing the number of cases where a user retries holding his hand. And a stable authentication can be achieved.

In the embodiment, the base point detector 11 acts as a detector configured to detect a base point of a middle finger, a base point of a ring finger, a base point of an index finger on a thumb side, and a base point of a little finger on an opposite side of the ring finger. The first standard point calculator 12 acts as a first calculator configured to calculate a first standard point between a base point of the middle finger on the ring finger side and a base point of the ring finger on the middle finger side. The second standard point calculator 13 acts as a second calculator configured to calculate a second standard point on a bisector of an angle that is formed by a straight line passing through a base point of the index finger on the thumb side and the first standard point and a straight line passing through a base point of the little finger on an opposite side of the ring finger, and the first standard point. The convertor 14 acts as a convertor configured to apply an affine conversion to the palm image so that coordinates of the first standard point and the second standard point are converted into predetermined coordinates.

[Third Embodiment]

In a third embodiment, a description will be given of a case where a normalized image is generated with use of base points of the index finger, base points of the middle finger, base points of the ring finger and base points of the little finger of a palm image. The base point detector 11 detects the base points $M_1$ and $M_2$ of the middle finger, the base points $R_1$ and $R_2$ of the ring finger, the base points $I_1$ and $I_2$ of the index finger and the base points S1 and S2 of the little finger with the same method as the second embodiment, as illustrated in FIG. 8. The first standard point calculator 12 calculates the first standard point A with the same method as the second embodiment, as illustrated in FIG. 8.

Figure 11:
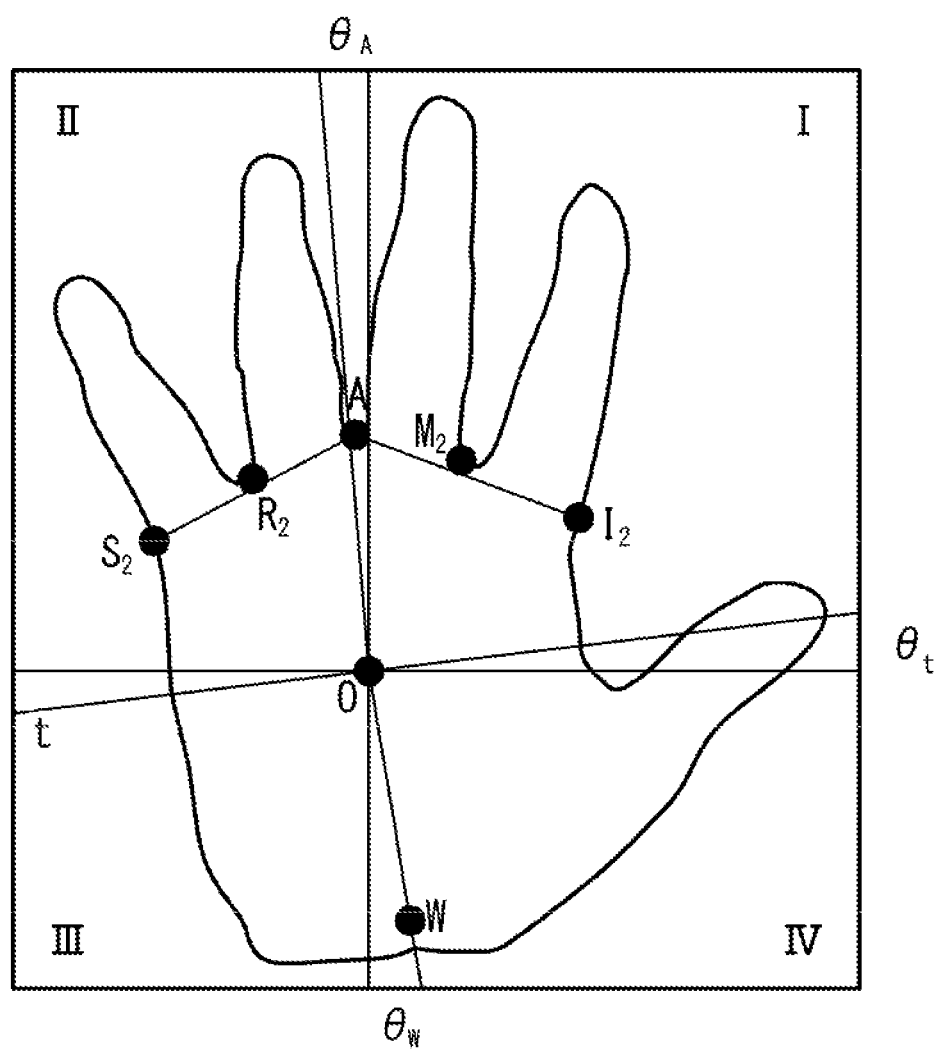
FIG. 11 illustrates a calculation of a standard point.

Next, the second standard point calculator 13 calculates the standard point O from two base points of a finger and the first standard point A with the same processes as the first embodiment. For example, as illustrated in FIG. 11, the second standard point calculator 13 calculates a point on a bisector of $\angle M_2AR_2$ as the standard point O, the point indicating a center position of the palm achieving a predetermined length ratio of a line segment AO and a line segment $M_1M_2$. And the second standard point calculator 13 calculates a point on a bisector of $\angle I_2AS_2$, the point indicating a lower edge position of the palm achieving a predetermined length ratio of a line segment AW and a line segment $I_2S_2$. The ratio for calculating the first standard point A, the standard point O and the standard point W may be determined with the same method as the first embodiment.

Next, the convertor 14 generates a normalized biometric image by applying an affine conversion to a palm image. For example, the convertor 14 moves the first standard point A to the center of the top edge of the image, moves the standard point O to the center of the image, and moves the standard point W to the center of the lower edge of the image.

As illustrated in FIG. 11, the convertor 14 divides the palm image into four regions with a straight line t that is a bisector of ∠AOW, a half line OA extending toward the first standard point A, and a half line OW extending toward the second standard point W. The regions are a region I to a region IV. Next, the convertor 14 applies an affine conversion to the regions and combines the affine-converted regions.

A horizontal size of the palm image is "w". A vertical size of the palm image is "h". A position of the standard point O is ($x_0$, $y_0$). A length of the line segment OA is "d". An inclination of the line segment OA with respect to the vertical direction of the image is "$\theta_A$". An inclination of the straight line t with respect to the horizontal direction is "$\theta_t$". An inclination of the line segment OW with respect to the vertical direction of the image is "$\theta_w$". An image $I_1$ of the region I before conversion is (x, y). An image $I_1'$ of the region I after conversion is (x', y'). The convertor 14 performs calculation in accordance with the following formula (3), and converts the direction of the line segment OA into the vertical direction with respect to the image and converts the direction of the straight line t into the horizontal direction with respect to the image.

$$\begin{pmatrix} x' \\ y' \\ 1 \end{pmatrix} = \quad \text{[Formula 3]}$$

-continued $$\begin{pmatrix} S_x\cos\theta & -\sin\theta & T_x \\ S_x\cos\theta\tan\varphi + \sin\theta & -\sin\theta\tan\varphi + S_y\cos\theta & T_x\tan\varphi + T_y \\ 0 & 0 & 1 \end{pmatrix}\begin{pmatrix} x \\ y \\ 1 \end{pmatrix}$$

The following relations are satisfied. $Sx=Sy=h/2d$, $Tx=Sx$ $(x_0-h/2)$, $TY=Sy(y_0-w/2)$ and $\phi=\theta_A-\theta_r$. Similarly, the convertor 14 applies an affine conversion to the regions II to IV. However, with respect to the regions III and IV, a length dW of the lie segment OW and an inclination $\theta_w$ of the line segment OW with respect to the vertical direction of the image are used instead of the length dA of the line segment OA and the inclination $\theta_A$ of the line segment OA with respect to the vertical direction of the image. When the results of the regions are combined, one sheet of a normalized biometric image is generated. When the midpoint of the palm and the lower edge point of the palm are out of the image, the similar process can be performed by making an extended image of which pixel value out of the image is zero.

The first standard point A, the standard point O and the standard point W are uniquely positioned in a hand of each user. Therefore, when the palm image is normalized by an affine-conversion with used of the standard points as standard, it is possible to stably make the same normalized images or normalized images similar to each other of the same user. Even if a part of a palm (for example, a lower part) is not included in the palm image, it is possible to make a normalized image. Accordingly, it is possible to correct a position gap with use of position information of a part of the palm image. Moreover, usability can be achieved by reducing the number of cases where a user retries holding of his hand. And a stable authentication can be achieved. Moreover, the palm image is divided into the four regions by the bisector of ∠AOW, the half straight line OA and the half straight line OW. In this case, it is possible to divide the palm image into a region of which position gap is large and a region of which position gap is small, even if a closing degree of the index finger is larger than those of other fingers and a degree of the position gap differs according to a position of the palm image. Therefore, it is possible to generate a stable normalized biometric image because the position gap of each region can be corrected.

In the embodiment, the base point detector 11 acts as a detector configured to detect a base point of a middle finger, a base point of a ring finger, a base point of an index finger on a thumb side, and a base point of a little finger on an opposite side of the ring finger. The first standard point calculator 12 acts as a first calculator configured to calculate a first standard point between a base point of the middle finger on the ring finger side and a base point of the ring finger on the middle finger side. The second standard point calculator 13 acts as a second calculator configured to calculate a second standard point on a bisector of an angle that is formed by a straight line passing through a base point of the index finger on the thumb side and the first standard point and a straight line passing through a base point of the little finger on an opposite side of the ring finger, and the first standard point. The first standard point A for calculating the standard point O corresponds to a first reference point. The standard point O corresponds to a second reference point. The convertor 14 acts as a convertor configured to apply an affine conversion to the palm image so that coordinates of the first standard point and the second standard point are converted into predetermined coordinates.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An image processing device comprising:
a biometric sensor configured to capture a palm image;
a memory; and
a processor coupled to the memory and the processor configured to execute a process, the process comprising:
detecting two base points of both sides of a first finger and two base points of both sides of a second finger next to the first finger from the palm image, the two base points of the second finger not being overlapped with the two base points of the first finger;
calculating a first standard point between one of the base points of the first finger on the second finger side and one of the base points of the second finger on the first finger side with use of a position of the base point of the first finger on the second finger side and a position of the base point of the second finger on the first finger side;
calculating a second standard point on a bisector of an angle that is formed by a straight line passing through one of the base points of the first finger on an opposite side of the second finger and the first standard point and a straight line passing through one of the base points of the second finger on an opposite side of the first finger, and the first standard point;
applying an affine conversion to the palm image so that coordinates of the first standard point and the second standard point are converted into predetermined coordinates;
collating the palm image after the applying and an enrolled feature; and
outputting a result of the collating,
wherein the first standard point is a midpoint of the base point of the first finger on the second finger side and the base point of the second finger on the first finger side or an intersection point of a straight line passing through the two base points of the first finger and a straight line passing through the two base points of the second finger.

2. An image processing device comprising:
a biometric sensor configured to capture a palm image;
a memory; and
a processor coupled to the memory and the processor configured to execute a process, the process comprising:
detecting two base points of both sides of a middle finger, two base points of both sides of a ring finger, a base point of an index finger on a thumb side, and a base point of a little finger on an opposite side of the ring finger, the two base points of the ring finger not being overlapped with the two base points of the middle finger;
calculating a first standard point between one of the base points of the middle finger on the ring finger side and one of the base points of the ring finger on the middle finger side with use of a position of the base point of the middle finger on the ring finger side and a position of the base point of the ring finger on the middle finger side;

calculating a second standard point on a bisector of an angle that is formed by a straight line passing through one of the base points of the index finger on the thumb side and the first standard point and a straight line passing through the base point of the little finger on an opposite side of the ring finger, and the first standard point;

applying an affine conversion to the palm image so that coordinates of the first standard point and the second standard point are converted into predetermined coordinates;

collating the palm image after the applying and an enrolled feature; and outputting a result of the collating, wherein the first standard point is a midpoint of the base point of the middle finger on the ring finger side and the base point of the ring finger on the middle finger side, an intersection point of a straight line passing through the two base points of the middle finger and a straight line passing through the two base points of the ring finger, or an intersection point of a straight line passing through the base point of the index finger on the middle finger side and the base point of the middle finger on the ring finger side and a straight line passing through the base point of the little finger on the ring finger side and the base point of the ring finger on the middle finger.

3. The image processing device as claimed in claim 2, wherein:

in the detecting, base points of a first finger and base points of a second finger next to the first finger are detected from the palm image;

in the calculating of the second standard point, a second reference point is calculated on a bisector of an angle that is formed by a straight line passing through a first reference point between a base point of the first finger on the second finger side and a base point of the second finger on the first finger side and a base point of the first finger on an opposite side of the second finger and a straight line passing through a base point of the second finger on an opposite side of the first finger, and the first reference point; and in the applying an affine conversion to, the affine conversion is applied to the palm image so that coordinates of the first standard point, the second standard point and the second reference point are converted into predetermined coordinates.

4. An image processing method comprising:

capturing a palm image by a biometric sensor;

detecting two base points of both sides of a first finger and two base points of both sides of a second finger next to the first finger from the palm image, the two base points of the second finger not being overlapped with the two base points of the first finger;

calculating a first standard point between one of the base points of the first finger on the second finger side and one of the base point of the second finger on the first finger side with use of a position of the base point of the first finger on the second finger side and a position of the base point of the second finger on the first finger side;

calculating a second standard point on a bisector of an angle that is formed by a straight line passing through one of the base point of the first finger on an opposite side of the second finger and the first standard point and a straight line passing through one of the base point of the second finger on an opposite side of the first finger, and the first standard point;

applying an affine conversion to the palm image so that coordinates of the first standard point and the second standard point are converted into predetermined coordinates;

collating the palm image after the applying and an enrolled feature; and outputting a result of the collating, wherein the first standard point is a midpoint of the base point of the first finger on the second finger side and the base point of the second finger on the first finger side or an intersection point of a straight line passing through the two base points of the first finger and a straight line passing through the two base points of the second finger.

5. An image processing method comprising:

capturing a palm image by a biometric sensor;

detecting two base points of both sides of a middle finger, two base points of both sides of a ring finger, a base point of an index finger on a thumb side, and a base point of a little finger on an opposite side of the ring finger, the two base points of the ring finger not being overlapped with the two base points of the middle finger;

calculating a first standard point between one of the base points of the middle finger on the ring finger side and one of the base points of the ring finger on the middle finger side with use of a position of the base point of the middle finger on the ring finger side and a position of the base point of the ring finger on the middle finger side;

calculating a second standard point on a bisector of an angle that is formed by a straight line passing through one of the base points of the index finger on the thumb side and the first standard point, the base point of the little finger on an opposite side of the ring finger, and the first standard point;

applying an affine conversion to the palm image so that coordinates of the first standard point and the second standard point are converted into predetermined coordinates;

collating the palm image after the applying and an enrolled feature; and outputting a result of the collating, wherein the first standard point is a midpoint of the base point of the middle finger on the ring finger side and the base point of the ring finger on the middle finger side, an intersection point of a straight line passing through the two base points of the middle finger and a straight line passing through the two base points of the ring finger, or an intersection point of a straight line passing through the base point of the index finger on the middle finger side and the base point of the middle finger on the ring finger side and a straight line passing through the base point of the little finger on the ring finger side and the base point of the ring finger on the middle finger.

6. The image processing method as claimed in claim 5, wherein:
in the detecting, base points of a first finger and base points of a second finger next to the first finger are detected from the palm image;
in the calculating of the second standard point, a second reference point is calculated on a bisector of an angle that is formed by a straight line passing through a first reference point between a base point of the first finger on the second finger side and a base point of the second finger on the first finger side and a base point of the first finger on an opposite side of the second finger and a straight line passing through a base point of the second finger on an opposite side of the first finger, and the first reference point; and
in the applying an affine conversion to, the affine conversion is applied to the palm image so that coordinates of the first standard point, the second standard point and the second reference point are converted into predetermined coordinates.

7. A computer readable, non-transitory medium storing a program that causes a computer to execute a process, the process comprising:
capturing a palm image by a biometric sensor;
detecting two base points of both sides of a first finger and two base points of both sides of a second finger next to the first finger from the palm image, the two base points of the second finger not being overlapped with the two base points of the first finger;
calculating a first standard point between one of the base points of the first finger on the second finger side and one of the base points of the second finger on the first finger side with use of a position of the base point of the first finger on the second finger side and a position of the base point of the second finger on the first finger side;
calculating a second standard point on a bisector of an angle that is formed by a straight line passing through a base point of the first finger on an opposite side of the second finger and the first standard point and a straight line passing through one of the base points of the second finger on an opposite side of the first finger, and the first standard point;
applying an affine conversion to the palm image so that coordinates of the first standard point and the second standard point are converted into predetermined coordinates;
collating the palm image after the applying and an enrolled feature; and
outputting a result of the collating,
wherein the first standard point is a midpoint of the base point of the first finger on the second finger side and the base point of the second finger on the first firmer side or an intersection point of a straight line passing through the two base points of the first firmer and a straight line passing through the two base points of the second finger.

8. A computer readable, non-transitory medium storing a program that causes a computer to execute a process, the process comprising:
capturing a palm image by a biometric sensor;
detecting two base points of both sides of a middle finger, two base points of both sides of a ring finger, a base point of an index finger on a thumb side, and a base point of a little finger on an opposite side of the ring finger, the two base points of the ring finger not being overlapped with the two base points of the middle finger;
calculating a first standard point between one of the base points of the middle finger on the ring finger side and one of the base points of the ring finger on the middle finger side with use of a position of the base point of the middle finger on the ring finger side and a position of the base point of the ring finger on the middle finger side;
calculating a second standard point on a bisector of an angle that is formed by a straight line passing through one of the base points of the index finger on the thumb side and the first standard point and a straight line passing through the base point of the little finger on an opposite side of the ring finger, and the first standard point;
applying an affine conversion to the palm image so that coordinates of the first standard point and the second standard point are converted into predetermined coordinates;
collating the palm image after the applying and an enrolled feature; and
outputting a result of the collating,
wherein the first standard point is a midpoint of the base point of the middle finger on the ring finger side and the base point of the ring finger on the middle finger side, an intersection point of a straight line passing through the two base points of the middle finger and a straight line passing through the two base points of the ring finger, or an intersection point of a straight line passing through the base point of the index finger on the middle finger side and the base point of the middle finger on the ring finger side and a straight line passing through the base point of the little finger on the ring finger side and the base point of the ring finger on the middle finger.

9. The medium as claimed in claim 8, wherein:
in the detecting, base points of a first finger and base points of a second finger next to the first finger are detected from the palm image;
in the calculating of the second standard point, a second reference point is calculated on a bisector of an angle that is formed by a straight line passing through a first reference point between a base point of the first finger on the second finger side and a base point of the second finger on the first finger side and a base point of the first finger on an opposite side of the second finger and a straight line passing through a base point of the second finger on an opposite side of the first finger, and the first reference point; and
in the applying of the affine conversion, the affine conversion is applied to the palm image so that coordinates of the first standard point, the second standard point and the second reference point are converted into predetermined coordinates.

* * * * *